US007717985B2

(12) United States Patent
White et al.

(10) Patent No.: US 7,717,985 B2
(45) Date of Patent: May 18, 2010

(54) SORPTION SYSTEMS WITH NATURALLY OCCURRING ZEOLITE, AND METHODS

(75) Inventors: Donald H. White, Savage, MN (US); William P. Weber, Chanhassen, MN (US); Brian G. McGill, Savage, MN (US)

(73) Assignee: Donaldson Company, Minneapolis, MN (US)

( * ) Notice: Subject to any disclaimer, the term of this patent is extended or adjusted under 35 U.S.C. 154(b) by 223 days.

(21) Appl. No.: 11/881,048

(22) Filed: Jul. 24, 2007

(65) Prior Publication Data

US 2008/0022857 A1     Jan. 31, 2008

Related U.S. Application Data

(60) Provisional application No. 60/820,420, filed on Jul. 26, 2006.

(51) Int. Cl.
*B01D 53/02* (2006.01)
(52) U.S. Cl. .............. 96/132; 96/121; 95/96; 95/114
(58) Field of Classification Search .......... 95/96, 95/114; 96/121, 122, 132, 153
See application file for complete search history.

(56) References Cited

U.S. PATENT DOCUMENTS

| | | | |
|---|---|---|---|
| 2,944,627 A | | 7/1960 | Skarstrom et al. |
| 4,830,641 A * | | 5/1989 | White et al. .......... 96/130 |
| 4,861,361 A | | 8/1989 | Jain et al. |
| 4,963,327 A | | 10/1990 | Russell |
| 4,964,889 A * | | 10/1990 | Chao .............. 95/96 |
| 5,213,593 A * | | 5/1993 | White, Jr. .......... 95/99 |
| 5,292,987 A | | 3/1994 | Zarchy et al. |
| 5,376,164 A | | 12/1994 | Zarchy et al. |
| 5,415,682 A | | 5/1995 | Zarchy et al. |
| 5,453,113 A | | 9/1995 | Zarchy et al. |
| 5,500,035 A | | 3/1996 | Zarchy et al. |
| 5,503,658 A | | 4/1996 | Zarchy et al. |
| 5,512,082 A | | 4/1996 | Zarchy et al. |
| 5,520,720 A | | 5/1996 | Lemcoff |
| 5,730,003 A | | 3/1998 | Nguyen et al. |
| 5,938,819 A | | 8/1999 | Seery |
| 6,017,382 A | | 1/2000 | Ji et al. |
| 6,113,869 A | | 9/2000 | Jain et al. |
| 6,156,950 A | | 12/2000 | Ragil et al. |
| 6,284,021 B1 | | 9/2001 | Lu et al. |

(Continued)

FOREIGN PATENT DOCUMENTS

JP          63-139990          6/1988

(Continued)

OTHER PUBLICATIONS

"Clinoptilolite." 1998-2000, *GSA Resources, Inc.* http://www.gsaresources.com/clinopti.htm.

(Continued)

*Primary Examiner*—Duane Smith
*Assistant Examiner*—Christopher P Jones
(74) *Attorney, Agent, or Firm*—Merchant & Gould P.C.

(57) ABSTRACT

An adsorption system with a sorbent bed that includes at least two distinct layer with two different sorbent materials, one of the sorbents being a natural zeolite such as clinoptilolite. The clinoptilolite is particularly suited to be positioned at the outlet end of the bed.

12 Claims, 3 Drawing Sheets

U.S. PATENT DOCUMENTS

| | | |
|---|---|---|
| 6,293,998 B1 | 9/2001 | Dolan et al. |
| 6,340,382 B1 | 1/2002 | Baksh et al. |
| 6,350,298 B1 | 2/2002 | Su et al. |
| 6,425,940 B1 | 7/2002 | Chao et al. |
| 6,444,014 B1 | 9/2002 | Mullhaupt et al. |
| 6,475,265 B1 | 11/2002 | Baksh et al. |
| 6,500,234 B1 | 12/2002 | Ackley et al. |
| 6,500,235 B2 | 12/2002 | Zhong et al. |
| 6,527,831 B2 | 3/2003 | Baksh et al. |
| 6,551,384 B1 | 4/2003 | Ackley et al. |
| 6,747,066 B2 | 6/2004 | Wang et al. |
| 6,790,260 B2 | 9/2004 | Ackley et al. |
| 6,929,680 B2 | 8/2005 | Krushnevych et al. |
| 6,992,112 B2 | 1/2006 | Wang et al. |
| 7,291,271 B2 * | 11/2007 | Galbraith .................... 210/670 |
| 2003/0082095 A1 * | 5/2003 | DiMascio .................. 423/477 |

FOREIGN PATENT DOCUMENTS

| | | |
|---|---|---|
| JP | 10-259011 | 9/1998 |
| WO | WO 2005/035100 A1 | 4/2005 |

OTHER PUBLICATIONS

"The Mineral Clinoptilolite." 1995-2007, *Amethyst Galleries, Inc.* http://www.galleries.com/minerals/silicate/clinopti.htm.

* cited by examiner

SORPTION SYSTEMS WITH NATURALLY OCCURRING ZEOLITE, AND METHODS

CROSS-REFERENCE TO RELATED APPLICATION

This application claims the benefit of U.S. provisional patent application having Ser. No. 60/820,420 filed Jul. 26, 2006 entitled Sorption Systems with Naturally Occurring Zeolite, the entire disclosure which is incorporated herein.

BACKGROUND OF THE INVENTION

The present invention relates to systems and methods for removing one or more substances from a gas containing the substances. In particular, it relates to systems and methods which use a sorbent material for sorbing one or more substances from the gas.

In a variety of commercial and industrial settings it is necessary to remove one or more substances from a gas before the gas can be used for a particular purpose. For example, before compressed air can be used to drive power tools, any water or water vapor must be removed from the compressed gas or the tools will rust. Likewise, before air contaminated with a toxic or noxious substance can be inhaled, the substance must be removed.

Many types of devices are available to remove one or more substances from a gas. One particularly effective class of devices is known as pressure swing sorption systems. Such a system directs a flow of the gas through a bed of sorbent (or adsorbent) material. A sorbent material is one which sorbs, i.e., absorbs or adsorbs, certain substances. During a sorption phase, the gas containing the substances, i.e., the inlet gas, is directed at a predetermined pressure through a sorbing chamber which contains the sorbent bed, and the substances are sorbed by the sorbent material. As the substances are sorbed by the sorbent material, the heat of absorption heats the sorbent bed and this heat is conserved, as taught in U.S. Pat. No. 2,944,627, one of the most widely recognized patents related to pressure swing absorbers. Because the substances are sorbed by the sorbent material, the outlet gas has reduced levels of the substances, and is preferably free of the substances.

To extend the useful life of these sorbing systems, a second sorbing chamber with a second sorbent bed is provided. The inlet gas is then redirected from the first sorbing chamber to the second sorbing chamber where the substance is sorbed by the sorbent material in the second sorbing chamber. The sorbent bed in the first sorbing chamber is then regenerated, i.e., purged or stripped of the substances it previously sorbed from the gas. During the regeneration phase, the first sorbing chamber is typically depressurized and a portion of the outlet gas from the second sorbing chamber is directed back through the first sorbing chamber, purging the substances from the sorbent bed. As taught by U.S. Pat. No. 2,944,627, the heat of adsorption induced in the sorbent bed of the first sorbing chamber during the sorption phase is substantially completely utilized to desorb the substance from the sorbent bed during the regeneration phase. The purge gas, now containing much of the substances previously sorbed by the sorbent bed, is then vented through an exhaust. Once the sorbent bed in the first sorbing chamber is sufficiently free of the substances, the first sorbing chamber may be repressurized and the inlet gas may be redirected through the first sorbing chamber while the second sorbing chamber is regenerated. The pressure swing sorption system can continue cycling between the sorption phase and the regeneration phase of the first and second sorbing chambers for an extended period.

As effective as these systems are, they nevertheless have certain undesirable characteristics. For example, the portion of the outlet gas which must be directed back through a sorbing chamber to regenerate the sorbent bed can be very large. For example, from about 15% to about 67% of the inlet gas may be used as purge gas to regenerate a sorbent bed. Consequently, the amount of output gas which can be used for its intended purpose is greatly reduced.

An attempt to solve various issues with these systems was made in U.S. Pat. No. 5,213,593. There is always room for additional improvements.

SUMMARY

The present disclosure is directed to various systems for providing air and gas purification by the adsorption of water vapor and other gaseous contaminants therefrom. In particular, the present disclosure provides a system that is a pressure swing sorption system having at least one sorbent bed having at least two sorbent materials, the two materials present as distinct layers. In another aspect, the present disclosure provides a system that is a temperature swing or thermal swing sorption system having at least one sorbent bed having at least two sorbent materials, the two materials present as distinct layers. For both systems, the sorbent at the outlet end of the chamber is preferably a naturally occurring zeolite, such as clinoptilolite. Others could also be considered for similar reasons.

DETAILED DESCRIPTION

The present disclosure is directed to various systems for providing air and gas purification by the adsorption of water vapor and other gaseous contaminants therefrom by using sorption systems that include distinct layers of sorbent materials. At least one of the sorbent materials is a naturally occurring zeolite, such as clinoptilolite.

Figure 1:
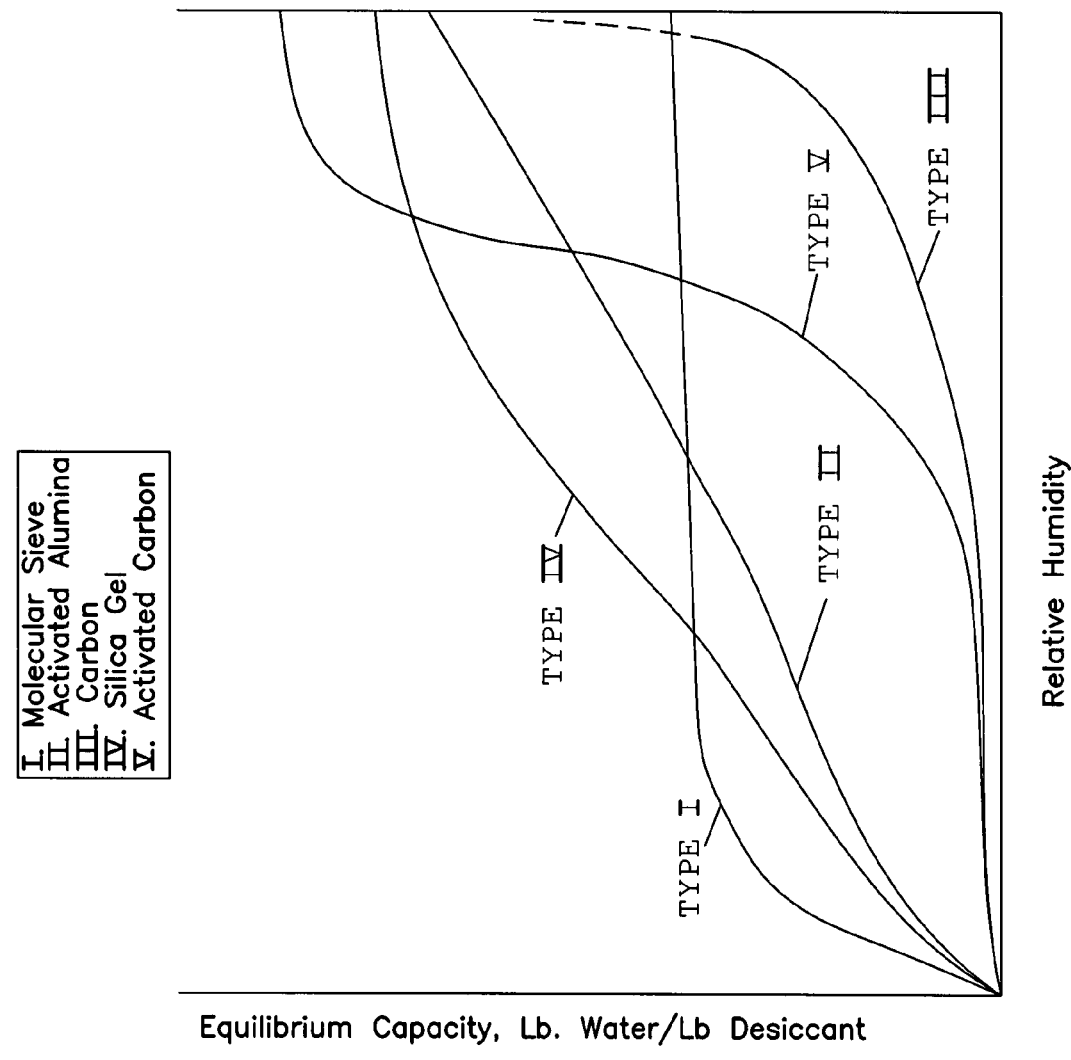
FIG. 1 is a graphical representation of water vapor adsorption on various adsorbents or sorbents.

In particular, the present disclosure provides pressure swing and thermal swing systems that include a sorbent bed having at least two sorbent materials, the two sorbent materials being present as distinct layers. In some embodiments, the sorbent at the outlet end of the chamber is a naturally occurring zeolite, such as clinoptilolite, which is a crystalline zeolitic medium that has a significant capacity for the adsorption of molecular contaminants. Other naturally occurring zeolites that can be used include chabisite and mortenite. Still others could also be considered for similar reasons. FIG. 1 provides isotherms for water vapor adsorption on various adsorbents or sorbents. Although not specifically pointed out on the figure, zeolites, such as clinoptilolite, have an equilibrium capacity generally similar to molecular sieves on the graph.

Clinoptilolite is a natural zeolite or molecular sieve material formed in volcanic lakes millions of years ago. It is a crystalline alumina silicate with micropores capable of adsorbing large quantities of moisture. Clinoptilolite is similar to another, better known, zeolite, the emerald, but is much less costly. Clinoptilolite is a very hard material (e.g., "stone hard") having a very high crush strength while maintaining low abrasion. The clinoptilolite is conducive to being placed at the bottom (or other lower level) of a packed bed, due to its high crush strength and resistance to cracking, breaking, or otherwise degrading due to pressure. The Zeolite (e.g., clinoptilolite, etc.) can be used as a trimmer in sorbent beds.

Clinoptilolite has a high volumetric heat capacity, higher than synthetic sorbents, so it can absorb more heat in a smaller volume of packed bed. Also, clinoptilolite has a higher capacity for adsorbing moisture from levels of 30% relative humidity (and lower) than synthetic adsorbents, on a volumetric bases.

By having the naturally occurring zeolite, e.g., clinoptilolite, present at the outlet (or outlet half) of the sorbent bed where the relative humidity is lower than at the inlet, removal of moisture from the gas stream is enhanced. Less zeolite (e.g., clinoptilolite) is need, on a volume basis, to remove the moisture. Thus, smaller volumes of beds can be utilized.

In accordance with this disclosure the packed bed systems include at least two distinct layers of sorbent materials. Benefits of using a natural zeolite in combination with another sorbent, such as a synthetic sorbent, include reduced effluent dewpoint and overall reduced system cost. For example, some commercial sorbent materials may be $0.90/lb; clinoptilolite is much less expensive, usually about $0.05/lb. Replacing any amount of the expensive sorbent with clinoptilolite or other natural zeolite will decrease the cost of the overall bed.

Another cost reduction due to the inclusion of naturally occurring zeolite is the overall cost of the beds (e.g., desiccant towers, vessels, etc.). Because clinoptilolite and other natural zeolites remove more moisture on a volume basis than synthetic sorbents, the volume and/or length of the beds (e.g., desiccant towers) can be reduced. This may lead to increased system flow rates, reduced dusting of desiccant granules, which can extend the life of any downstream physical filter.

It is believed that levels of as low as 10% (volume %) of clinoptilolite in the total sorbent bed would provide improved processing conditions. In many embodiments, no more than about 80% or 90% of the bed is clinoptilolite. In some embodiments, the volume of clinoptilolite is 20% to 60%, often about 30-50%.

The general construction and workings of pressure swing and thermal swing adsorbent systems are generally well known and are not described herein. Referring to the figures, however, two exemplary systems are shown that utilize sorbent beds or chambers having at least two sorbent materials, with one of the materials being naturally occurring zeolite, such as clinoptilolite.

Figure 2:
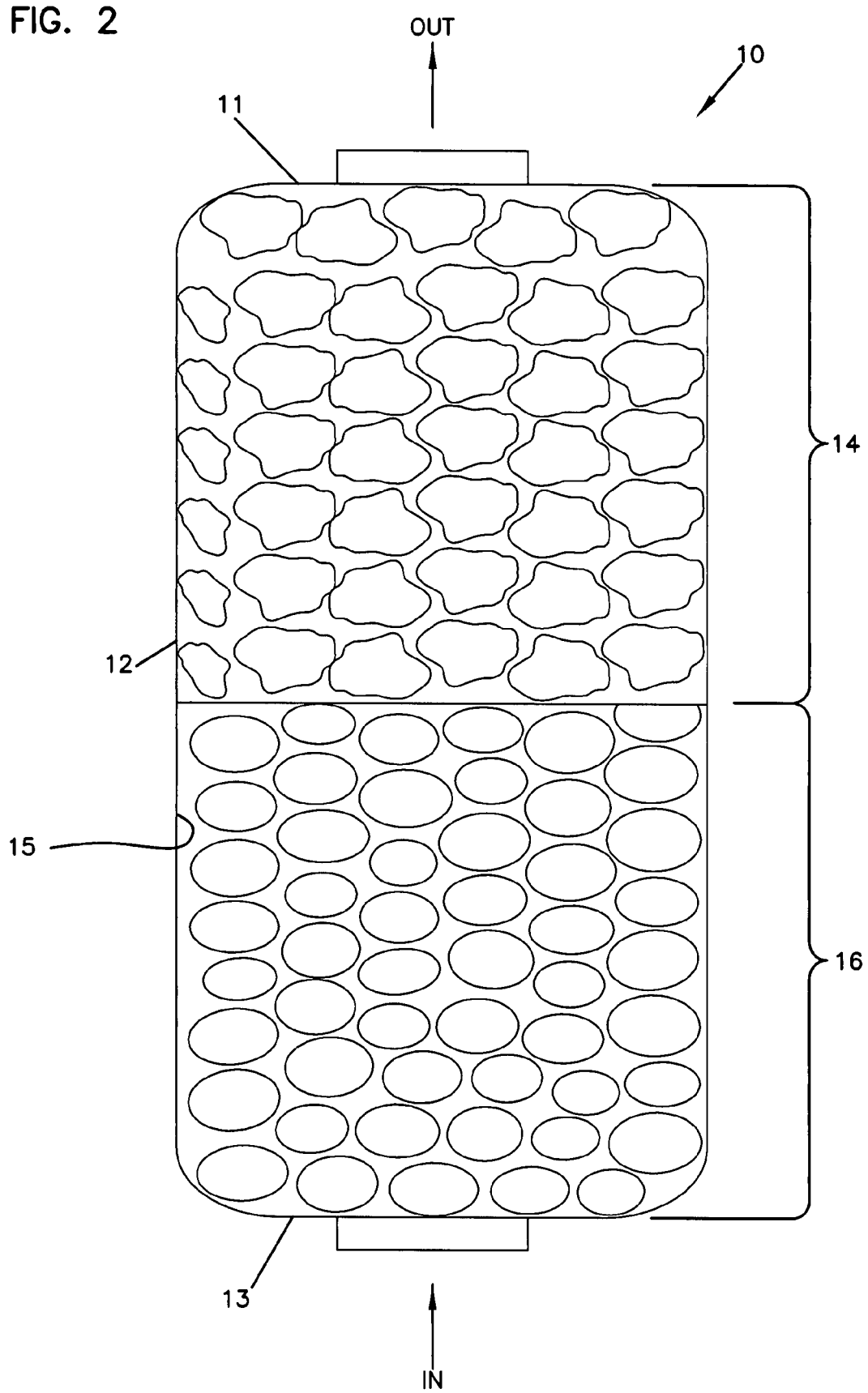
FIG. 2 is a schematic diagram of a pressure swing trimmed sorbent bed.

In FIG. 2, a system 10 is illustrated that includes a tank or vessel 12 having a top end 11 and a bottom end 13, as oriented. Vessel 12 has an interior volume 15 between ends 11, 13 for receiving a volume of sorbent material. In this embodiment, system 10 includes a first sorbent layer 14 and a second sorbent layer 16.

In one configuration of system 10, bottom end 13 is an inlet and top end 11 is an outlet from interior volume 15. Such a configuration can be referred to as a pressure swing trimmed bed, having the air flow in a generally upward direction, i.e., the outlet end is positioned above the inlet end. It is understood that some pressure swing trimmed beds may have the air flow in the opposite direction.

Preferably, first sorbent layer 14, the downstream layer in this configuration, includes the naturally occurring zeolite (e.g., clinoptilolite). Second sorbent layer 16, the upstream layer in this configuration, is a second sorbent; alumina (e.g., activated alumina) is one suitable sorbent.

In the particular configuration illustrated, the volume percentage of the two layers is approximately equal (i.e., each is about 50%), however, in some embodiments either layer may occupy more volume than the other.

Figure 3:
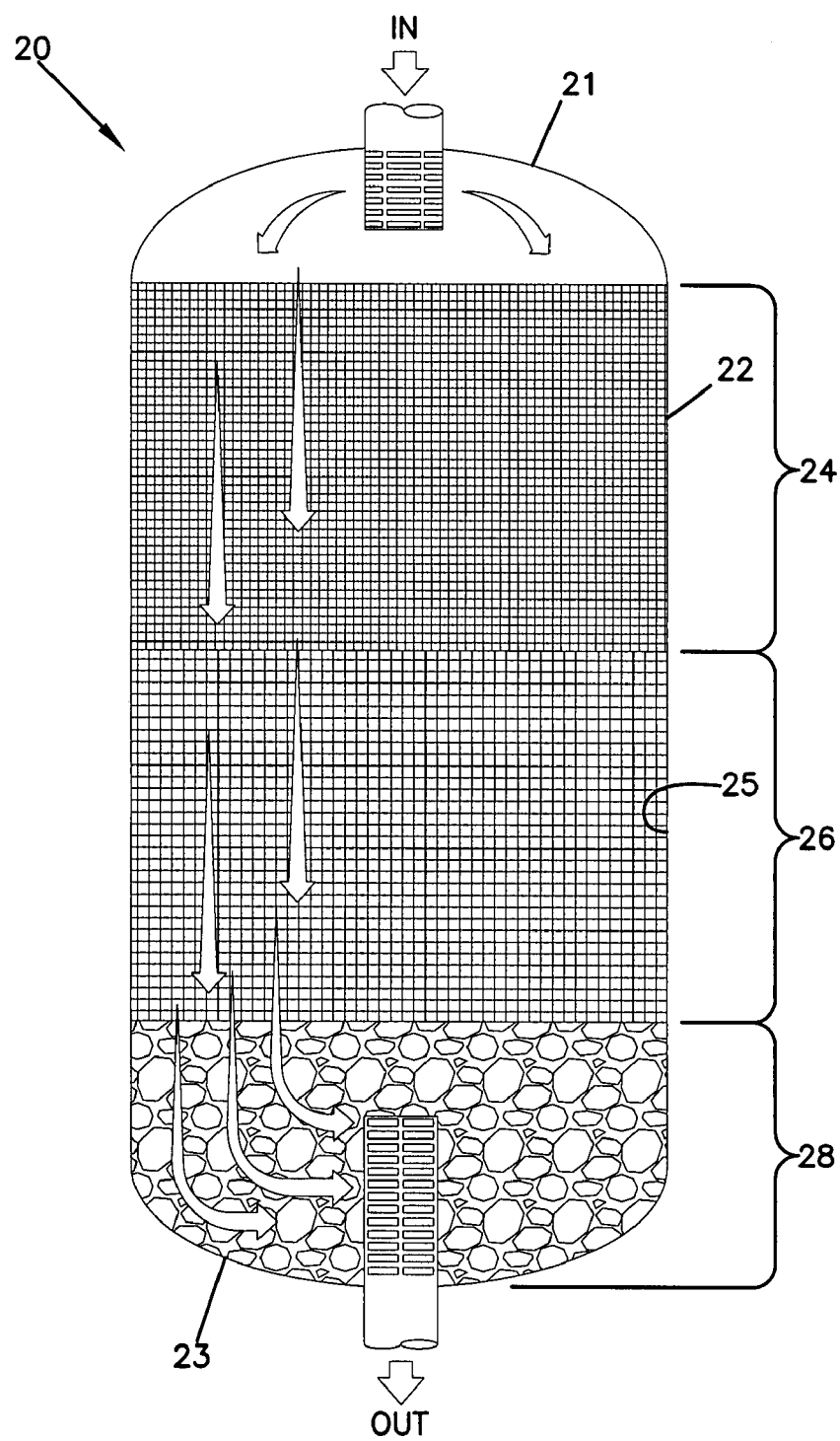
FIG. 3 is a schematic diagram of a thermal swing trimmed sorbent bed.

In FIG. 3, an alternate system 20 is illustrated that includes a tank or vessel 22 having a top end 21 and a bottom end 23, as oriented. Vessel 22 has an interior volume 25 between ends 21, 23 for receiving a volume of sorbent material. In this embodiment, system 20 includes a first sorbent layer 24, a second sorbent layer 26, and a third layer 28. An unfilled space (e.g., air head) is present between first sorbent layer 24 and top end 21.

In one configuration of system 20, top end 21 is an inlet and bottom end 23 is an outlet from interior volume 25. Such a configuration can be referred to as a temperature or thermal swing trimmed bed, having the air flow in a generally downward direction, i.e., the inlet end is positioned above the outlet end. It is understood that some temperature or thermal swing trimmed beds may have the air flow in the opposite direction.

In this particular embodiment, second sorbent layer 26, the downstream sorbent layer in this configuration, includes the naturally occurring zeolite (e.g., clinoptilolite). First sorbent layer 24, the upstream layer in this configuration, is a second sorbent, such as alumina (e.g., activated alumina). Third layer 28, in this embodiment, is a zeolite support layer, formed of zeolite material of larger particle size than the zeolite of second sorbent layer 26.

Third layer 28 is a support media. In many conventional desiccant dryers, a bottom head or layer is provided that is filled with the same desiccant that is used for adsorption. Because it is the downstream most layer, this material never sees the moisture and is therefore an unnecessary expense. Clinoptilolite has been discovered to be a very practical media for bed support, due to its increased crush strength and low cost. It also contributes the ability to adsorb trace amounts of water vapor and other contaminants in downflow adsorption systems that might reach layer 28.

In the particular configuration illustrated in FIG. 3, the volume percentage of first sorbent layer 24 and second sorbent layer 26 is approximately equal (i.e., each is about 50%). However, when considering third layer 28, the volume ratio is about 40:40:20 for layers 24:26:28.

As stated above, it is desired that there are at least two distinct sorbent layers (e.g., layers 14 and 16 of system 10 and layers 24 and 26 of system 20) in the systems of the present disclosure. Although having the outlet end layer being natural zeolite is the preferred construction, each of the sorbent layers may, however, be a combination of two or more sorbent materials. For such systems, it is preferred that the natural zeolite occupies at least about 10% of the outlet end layer of the adsorbent beds; preferentially at least about 20%, and most preferentially at least about 30%. Embodiments having at least 50% by volume natural zeolite are also suitable. It has been found that a generally high total capacity for either pressure swing or temperature swing absorption beds is obtained by using either alumina or silica gel in the inlet layer (e.g., layer 16 of system 10 and layer 24 of system 20) and clinoptilolite in the outlet layer (e.g., layer 14 of system 10 and layer 26 of system 20).

For a pressure swing bed, such as system 10 of FIG. 2, also often referred to as a pressure swing dryer, the heat holding capacity at the outlet end is a significant focus; having the natural zeolite in this region also provides the additional benefit of moisture adsorbing capacity.

It is generally known that the outlet region of adsorption beds used in pressure swing adsorption systems is used primarily to retain the heat of adsorption liberated during the adsorption process. This heat is needed to effectively regenerate the adsorbent beds during the regeneration phase of the pressure swing pressure. Clinoptilolite and other naturally occurring zeolites have a much higher heat holding capacity than commercial synthetic adsorbents and are therefore beneficial in the outlet regions of the adsorbent beds of pressure swing adsorption systems.

For temperature or thermal swing beds or dryers, such as system 20 of FIG. 3, the outlet ends are configured to adsorb water vapor at low partial pressure, because the preponderance of the water vapor and other contaminants are adsorbed in the inlet regions of the adsorption beds. Conventionally, synthetic activated alumina and silica get are commonly used in adsorption beds for thermal swing dryers, as they offer high capacities at elevated partial pressure. However, clinoptilolite and other natural zeolites provide improved capacity at low partial pressure, below 20% relative humidity.

Since many embodiments of the invention can be made without departing from the spirit and scope of the invention, the invention resides in the claims hereinafter appended.

We claim:

1. A sorbent bed comprising an inlet, an outlet, and an interior volume therebetween, the volume retaining a first sorbent layer comprising a first sorbent material, a second sorbent layer downstream of the first sorbent layer and comprising particles of clinoptilolite, and a third sorbent layer downstream of the second sorbent layer and comprising particles of clinoptilolite that are larger than the clinoptilolite particles in the second sorbent layer.

2. The sorbent bed according to claim 1, wherein the third sorbent layer is proximate the outlet.

3. The sorbent bed according to claim 1, wherein the sorbent bed is a pressure swing bed, and the outlet is positioned above the inlet.

4. The sorbent bed according to claim 1, wherein the sorbent bed is a thermal swing bed, and the outlet is positioned below the inlet.

5. The sorbent bed according to claim 1, wherein the clinoptilolite of the second sorbent layer occupies at least 20% of the volume.

6. The sorbent bed according to claim 5, wherein the clinoptilolite of the second sorbent layer occupies no more than 90% of the volume.

7. The sorbent bed according to claim 6, wherein the clinoptilolite of the second sorbent layer occupies about 30-50% of the volume.

8. The sorbent bed according to claim 1, wherein the second sorbent layer comprises at least about 30% clinoptilolite.

9. A sorbent bed according to claim 1 wherein the first sorbent layer comprises activated alumina.

10. A sorbent bed according to claim 9, wherein the first sorbent layer comprises about 40% of the volume, the second sorbent layer comprises about 40% of the volume, and the third sorbent layer comprises about 20% of the volume.

11. A sorbent bed comprising an inlet, an outlet, and an interior volume therebetween, the volume retaining a first sorbent layer comprising a first sorbent material, a second sorbent layer downstream of the first sorbent layer and consisting essentially of particles of clinoptilolite, and a third sorbent layer downstream of the second sorbent layer and consisting essentially of particles of clinoptilolite that are larger than the particles of clinoptilolite in the second sorbent layer.

12. A pressure swing or thermal swing system that utilizes a sorbent bed that comprises a first layer of clinoptilolite particles at the outlet of the bed, a layer of a different sorbent at the inlet of the bed, and a second layer of clinoptilolite particles disposed between the first layer of clinoptilolite and the layer of a different sorbent, wherein the particles of clinoptilolite in the first layer are larger than the particles of clinoptilolite in the second layer.

* * * * *